United States Patent [19]

Nasu

[11] 4,367,501
[45] Jan. 4, 1983

[54] BEARING DEVICE FOR CAPSTAN SHAFT
[75] Inventor: Mitsuo Nasu, Hachioji, Japan
[73] Assignee: Olympus Optical Company Limited, Tokyo, Japan
[21] Appl. No.: 178,824
[22] Filed: Aug. 18, 1980
[30] Foreign Application Priority Data
Aug. 20, 1979 [JP] Japan .................. 54-114335[U]
[51] Int. Cl.³ .................. G11B 15/00; F16C 17/04; B65H 17/02
[52] U.S. Cl. .................. 360/96.3; 308/139
[58] Field of Search .................. 360/96.1, 96.3–96.5; 226/188–190, 194; 308/139

[56] References Cited
U.S. PATENT DOCUMENTS
4,283,095 8/1981 Osanai .................. 360/96.3 X Primary Examiner—John H. Wolff
Attorney, Agent, or Firm—Toren, McGeady and Stanger

[57] ABSTRACT

A bearing device of a capstan shaft for use in a tape recorder including a capstan shaft, a bearing member for supporting the capstan shaft, and a flywheel secured to the capstan shaft, a part of the secured portion being positioned in a tape cassette.

1 Claim, 3 Drawing Figures

BEARING DEVICE FOR CAPSTAN SHAFT

BACKGROUND OF THE INVENTION

The present invention relates to a bearing device for a capstan shaft suitable for forming an extremely thin tape recorder.

In tape recorders, a flywheel is integrally formed with a capstan shaft so as to stabilize rotation of the capstan shaft and to drive the capstan shaft by means of the flywheel.

There is also provided a capstan bearing device for supporting the capstan shaft, and a device of this type is shown in FIG. 1, in which a capstan shaft 2 provided with a flywheel 1 is supported by a bearing member 3 and under this condition the top of the capstan shaft 2 may be inserted into a tape cassette 4.

In such construction, however, a securing portion of the flywheel 1 and the bearing member 3 occupy a comparatively large portion of the capstan shaft 2 in the axial direction thereof, so that it is difficult to form the tape recorder with a sufficiently thin configuration. In order to design a thin tape recorder, therefore, it is attempted to make the size of the bearing member 3 shorter in the axial direction. However, shortening the size of the bearing member increases the load on the bearing, increases electrical current consumption, increases the likelihood that the capstan shaft 2 will become loosened, and diminishes the durability of the tape recorder.

A device of the type described above is shown in FIG. 2, wherein the capstan shaft 2 provided with the flywheel 1 is supported by the bearing member 3 at the upper portion of the flywheel 1 and a part of the bearing member 3 is located to extend to within the tape cassette 4.

With a construction of this type however, in the case of a superminiature tape recorder, the cassette 4 and the magnetic tape will be located extremely close to the bearing member 3, so that oil from the bearing member 3 will adhere to the cassette or to the tape through the capstan shaft 2, and thus the cassette 4 will be damaged and become impossible to use.

SUMMARY OF THE INVENTION

It is an object of the present invention to eliminate the above mentioned disadvantages.

It is another object of the invention to provide a bearing device for a capstan shaft which will enable formation of an extremely thin tape recorder and prevent the cassette side from being damaged by insertion therein of a part of the securing portion of the flywheel.

According to the present invention a bearing device for the capstan shaft comprises a capstan shaft, a bearing member for supporting the capstan shaft, and a flywheel secured to the capstan shaft, the bearing member being located on the capstan shaft on a side of the flywheel opposite the side where the capstan shaft engages a tape cassette, a part of the secured portion of the flywheel being positioned in a tape cassette.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
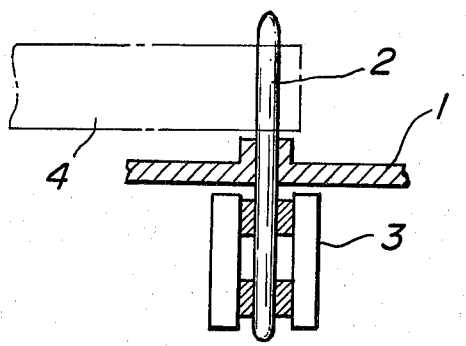
FIGS. 1 and 2 are fragmentary sectional views showing conventional bearing devices for a capstan shaft.
Figure 2:
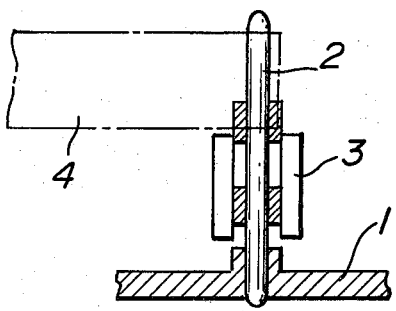
Figure 3:
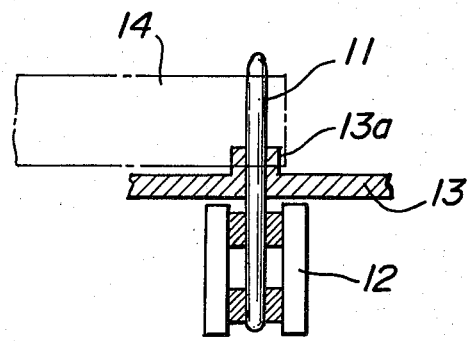
FIG. 3 is a fragmentary sectional view showing one embodiment of a bearing device for capstan shaft according to the present invention.

Referring now to the drawings, FIG. 3 shows a bearing device for a capstan shaft according to the present invention. Reference numeral 11 is a capstan shaft, and this capstan shaft 11 is supported by a bearing member 12. The capstan shaft 11 is further provided with a flywheel 13 at the upper portion of the bearing member 12. This flywheel 13 is located to extend to within a tape cassette 14 at a part of a securing portion 13a, that is, at the upper side portion of the securing portion 13a. Under such state, a top portion of the capstan shaft 11 can be freely inserted into the tape cassette 14.

According to such construction, a part of the securing portion 13a of the flywheel 13 can be inserted into the inside of the tape cassette 14, so that a tape recorder can be made extremely thin without making the size of the bearing member 12 in the axial direction small. Moreover, it means that the size of the bearing member 12 in the axial direction can be secured, an increase of the current to be consumed as well as an increase of the load upon the bearing can be prevented, and the capstan shaft 11 will not tend to become loosened so that its durability is not impaired. Furthermore, the flywheel 13 is interposed between the bearing member 12 and the tape cassette 14, so that oil of the bearing member 12 can be prevented from spreading into the tape cassette 14, and the tape cassette 14 can positively be prevented from acquiring any stains.

In addition, the present invention is not limited to the above embodiment but can be modified without departing from the scope of the invention.

As described above, the present invention can provide a bearing device for a capstan shaft which can enable a tape recorder to be made in an extremely thin shape and can prevent the cassette side from acquiring stains by inserting a part of the securing portion of the flywheel into the tape cassette.

What is claimed is:

1. A capstan shaft assembly for a tape recorder comprising:
   a capstan shaft having an engagement end portion operative to be received within and engage a tape cassette which is placed in operative position within said tape recorder;
   a bearing member supportively engaging said capstan shaft along a portion thereof other than said engagement end portion; and
   a flywheel including a securing portion securing said flywheel to said capstan shaft;
   said flywheel being secured on said capstan shaft to be located between said engagement end portion of said capstan shaft and said bearing member with said securing portion being configured to extend to within a tape cassette placed within said tape recorder in engagement with said engagement end portion of said capstan shaft;
   said flywheel being thereby arranged to be located between said tape cassette and said bearing member when said tape cassette is placed in operative position within said tape recorder.

* * * * *